(12) United States Patent
Lunteren

(10) Patent No.: US 8,543,528 B2
(45) Date of Patent: Sep. 24, 2013

(54) EXPLOITATION OF TRANSITION RULE SHARING BASED ON SHORT STATE TAGS TO IMPROVE THE STORAGE EFFICIENCY

(75) Inventor: Jan van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/888,740

(22) Filed: Sep. 23, 2010

(65) Prior Publication Data

US 2012/0078832 A1  Mar. 29, 2012

(51) Int. Cl.
*G06N 5/02* (2006.01)

(52) U.S. Cl.
USPC ............................................. 706/47

(58) Field of Classification Search
USPC ............................................. 706/47; 718/100
See application file for complete search history.

(56) References Cited

U.S. PATENT DOCUMENTS

| | | | |
|---|---|---|---|
| 7,508,985 B2 | 3/2009 | Van Lunteren | |
| 7,734,091 B2 | 6/2010 | Van Lunteren | |
| 2007/0124146 A1 | 5/2007 | Lunteren | |
| 2008/0263039 A1 | 10/2008 | Van Lunteren | |
| 2009/0055343 A1 | 2/2009 | Van Lunteren | |
| 2009/0307175 A1 | 12/2009 | Francesco et al. | |

OTHER PUBLICATIONS

Jan Van Lunteren, "High-Performance Pattern-Matching for Intrusion Detection", IBM Research, Zurich Research Laboratory, pp. 1-13, copyright 2006.

Jan Van Lunteren, et al, "Regular Expression Acceleration at Multiple Tens of Gb/s", IBM Research, Zurich Research Laboratory, pp. 1-8, copyright 2008.

*Primary Examiner* — Jeffrey A Gaffin
*Assistant Examiner* — Ola Olude Afolabi
(74) *Attorney, Agent, or Firm* — Cantor Colburn LLP; Daniel Morris

(57) ABSTRACT

A mechanism is provided with an address generator that is operative to receive a current state vector and a current input value, and the address generator is operative to generate a memory address corresponding to a transition rule in response to the current state vector and the current input value. A transition rule memory includes a memory addresses, and the memory address is a location in the transition rule memory. The transition rule is a transition rule vector that includes a short state tag field. The short state tag field includes fewer bits than the current state vector.

17 Claims, 11 Drawing Sheets

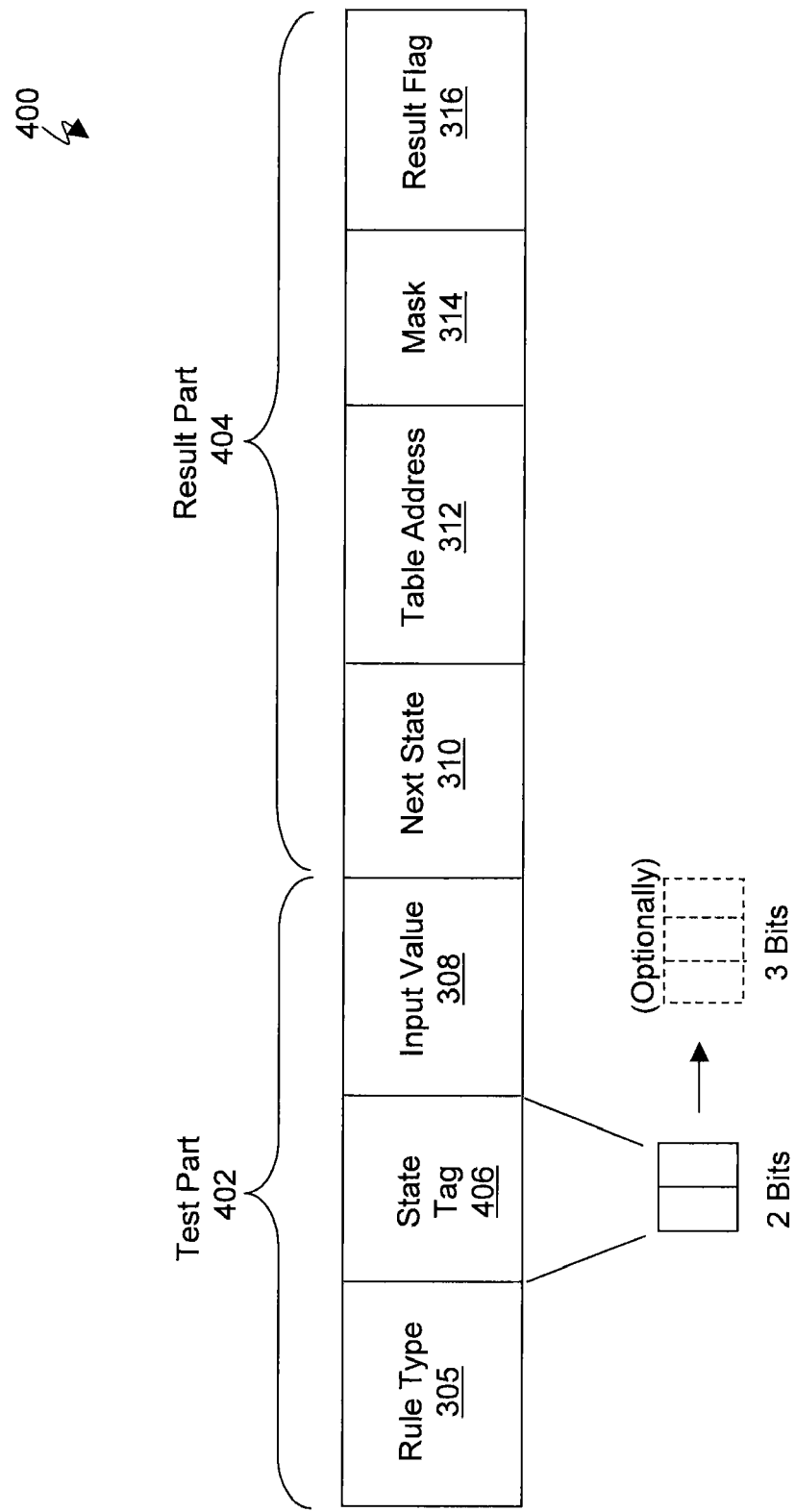

FIG. 5

```
bool Cluster::checkForCollisionsOnCurStateVector(unsigned int encStateVector,
                                                  unsigned int mask) {
    bool collisionFound = false;

for (int i=0;!collisionFound && (i<this->mappedStateCount);i++) {
        State *mappedState = this->mappedStateArray[i];

if ((mappedState->stateVector & ShortStateTagMask) ==
            (encStateVector & ShortStateTagMask)) {
            // identical short state tags int commonNegatedMask = (~mask & ~(mappedState->mask));
            if ((encStateVector & commonNegatedMask) ==
                (mappedState->stateVector & commonNegatedMask)) {
                // no difference in hash-index bits at common bit positions that for both
                // state/mask combinations are extracted from the state vectors
                collisionFound = true;
                break;
            }
        }
    }
    return collisionFound;
}
```

| Shared Rules | | |
|---|---|---|
| R1 | state = 4 or 11 | input = 64h 0110 0100b 'd' -> next state = S 5 |
| R2 | state = 4 or 11 | input = 6Bh 0110 1011b 'k' -> next state = S D |

| Unique Rules | | |
|---|---|---|
| R3 | state = S 4 | input = 78h 0111 1000b 'x' -> next state = S 9 |
| R4 | state = S 11 | input = 70h 0111 0000b 'p' -> next state = S 12 |

| Shared Rules |
|---|
| S 4 : encoded state vector = 0 0000 0000b     mask = 000 0000b |
| S 11: encoded state vector = 0 1000 0000b     mask = 001 0000b |

EXPLOITATION OF TRANSITION RULE SHARING BASED ON SHORT STATE TAGS TO IMPROVE THE STORAGE EFFICIENCY

BACKGROUND

Exemplary embodiments relate generally to pattern matching in a data processing system, and more specifically to transition rule sharing based on short state tags.

A clear trend that can be observed in the Internet is the increasing amount of packet data that is being inspected before a packet is delivered to its destination. In the early days, packets were solely routed based on their destination address. Later, firewall and quality-of-service (QoS) applications emerged that examined multiple fields in the packet header, for example, the popular 5-tuple consisting of addresses, port numbers and protocol byte. More recently, network intrusion detection systems (NIDS), virus scanners, filters and other "content-aware" applications go one step further by also performing scans on the packet payload. Although the latter type of applications tend to reside closer to the end user, thus involving link speeds that are only a fraction of the speeds in the backbone, the ongoing performance improvements throughout the Internet make it very challenging to perform the required packet processing at full wire-speed.

Pattern matching functions may be utilized for intrusion detection and virus scanning applications. Many pattern matching algorithms are based on finite state machines (FSMs). A FSM is a model of behavior composed of states, transitions, and actions. A state stores information about the past, i.e., it reflects the input changes from the start to the present moment. A transition indicates a state change and is described by a condition that would need to be fulfilled to enable the transition. An action is a description of an activity that is to be performed at a given moment. A specific input action is executed when certain input conditions are fulfilled at a given present state. For example, a FSM can provide a specific output (e.g., a string of binary characters) as an input action.

A hash table is a data structure that can be used to associate keys with values: in a hash table lookup operation the corresponding value is searched for a given search key. For example, a person's phone number in a telephone book could be found via a hash table search, where the person's name serves as the search key and the person's phone number as the value. Caches, associative arrays, and sets are often implemented using hash tables. Hash tables are very common in data processing and implemented in many software applications and many data processing hardware implementations.

Hash tables are typically implemented using arrays, where a hash function determines the array index for a given key. The key and the value (or a pointer to their location in a computer memory) associated to the key is then stored in the array entry with this array index. This array index is called the hash index. In the case that different keys are associated to different values but those different keys have the same hash index, this collision is resolved by an additional search operation (e.g., using chaining) and/or by probing.

A balanced routing table search (BaRT) FSM (B-FSM) is a programmable state machine, suitable for implementation in hardware and software. A B-FSM is able to process wide input vectors and generate wide output vectors in combination with high performance and storage efficiency. B-FSM technology may be utilized for pattern-matching for intrusion detection and other related applications. The B-FSM employs a special hash function, referred to as "BaRT", to select in each cycle one state transition out of multiple possible transitions in order to determine the next state and to generate an output vector. More details about the operation of a B-FSM is described in a paper authored by inventor Jan Van Lunteren, which is herein incorporated by reference, entitled "High-Performance Pattern-Matching for Intrusion Detection", Proceedings of IEEE INFOCOM '06, Barcelona, Spain, April 2006.

BRIEF SUMMARY

An apparatus is provided in accordance with exemplary embodiments. An address generator is operative to receive a current state vector and a current input value, and the address generator is operative to generate a memory address corresponding to a transition rule in response to the current state vector and the current input value. A transition rule memory includes a memory addresses, and the memory address is a location in the transition rule memory. The transition rule is a transition rule vector that includes a short state tag field. The short state tag field includes fewer bits than the current state vector.

An apparatus is provided in accordance with exemplary embodiments. A transition rule memory includes memory addresses which are locations in the transition rule memory. A pattern compiler is operative to determine input values for states, determine next states for the states, for the states that have matching input values and matching next states, determine that the states have a shared rule. For the states that have the shared rule, the pattern compiler is operative to store the share rule in the transition rule memory at a same memory address to be utilized by the states that have the shared rule.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 4 illustrates an exemplary transition rule vector in accordance with exemplary embodiments.

FIG. 5 illustrates an example code fragment in accordance with exemplary embodiments.

FIG. 7 illustrates shared rules according to exemplary embodiments.

FIG. 8 illustrates unique rules according to exemplary embodiments.

FIG. 9 illustrates encoding according to exemplary embodiments.

DETAILED DESCRIPTION

Figure 1:
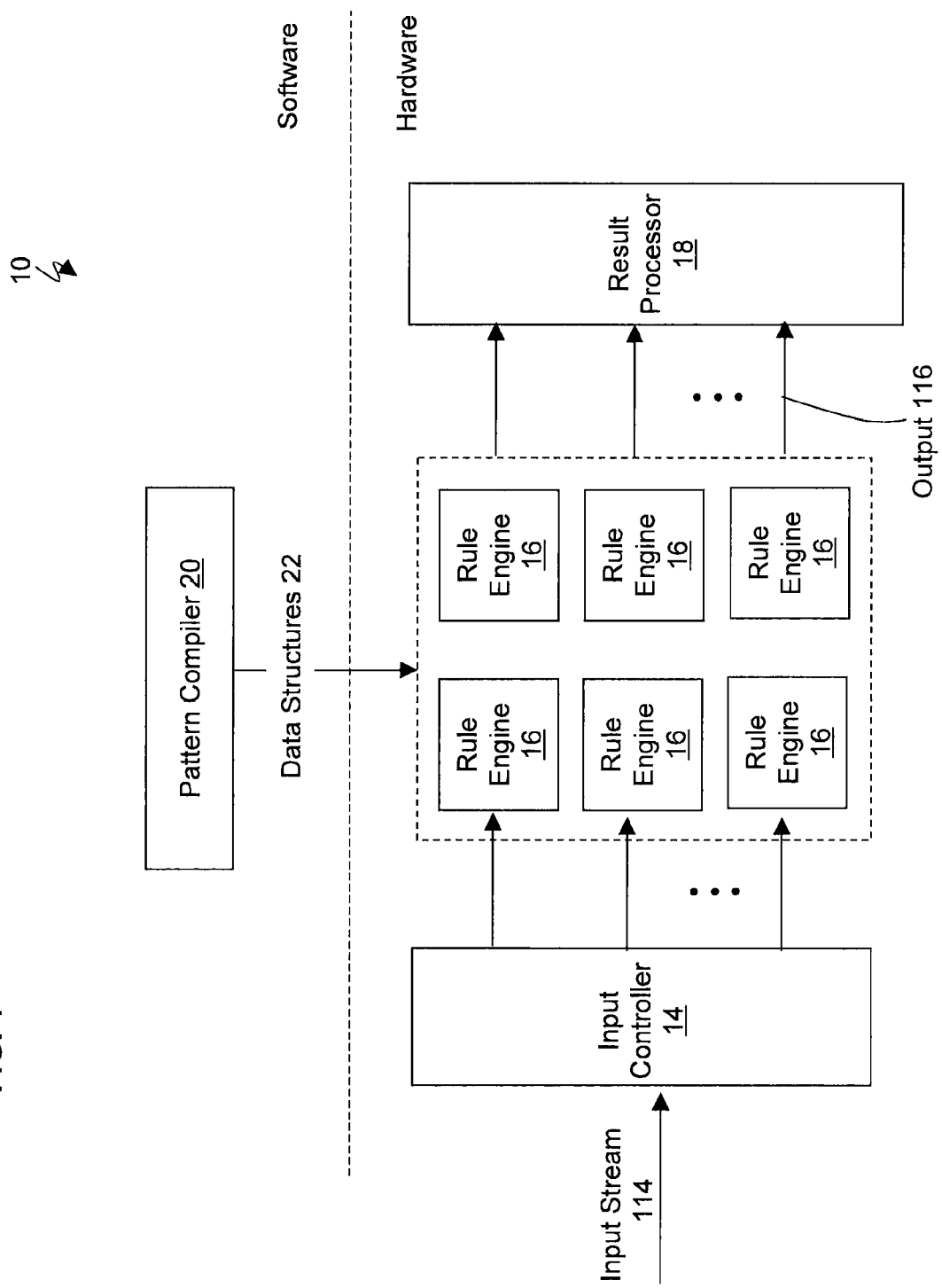
FIG. 1 illustrates one example of a design of an apparatus in accordance with exemplary embodiments.

FIG. 1 illustrates one example of a design of an apparatus 10, with multiple rule engines 16 placed in parallel (e.g. in an array) according to exemplary embodiments.

Each rule engine 16 receives the data stream 114 as an input value via an input controller 14 and passes an output to the results processor 18. Each rule engine 16 carries out independent pattern matching on a discrete number of patterns, and each rule engine 16 can work on patterns not covered by the other rule engines 16.

However, the rule engines 16 can be arranged in pairs of rule engines 16, with each pair of rule engines 16 processing alternate portions of the data stream 114. For example, one member of the pair could work on the even bytes of the data stream 114, with the other member of the pair of engines 16 working on the odd bytes. The results processor 18 is therefore arranged to combine the outputs 116 of each pair of rule engines 16. Other arrangements for the rule engines 16 are possible, including having the engines 16 working in series, with different aspects of a pattern match being carried out by different rule engines 16.

The results processor 18 can provide support for rules involving multiple patterns, such as checking the occurrences, order, and offsets/distances of multiple patterns. The output of the (multiple) rule engines 16 comprises the pattern identifiers that have been detected in the input stream 114 combined with the offsets at which these have been detected. The result processor 18 component will then be able (based on a data structure stored in a local memory which is not shown) to check rules specifying additional conditions regarding the location where patterns should be detected (e.g., exact location, certain portion, or in the entire input stream 114), as well as conditions regarding the order in which multiple patterns should be detected and the distance between them (i.e., between the offsets).

Figure 2:
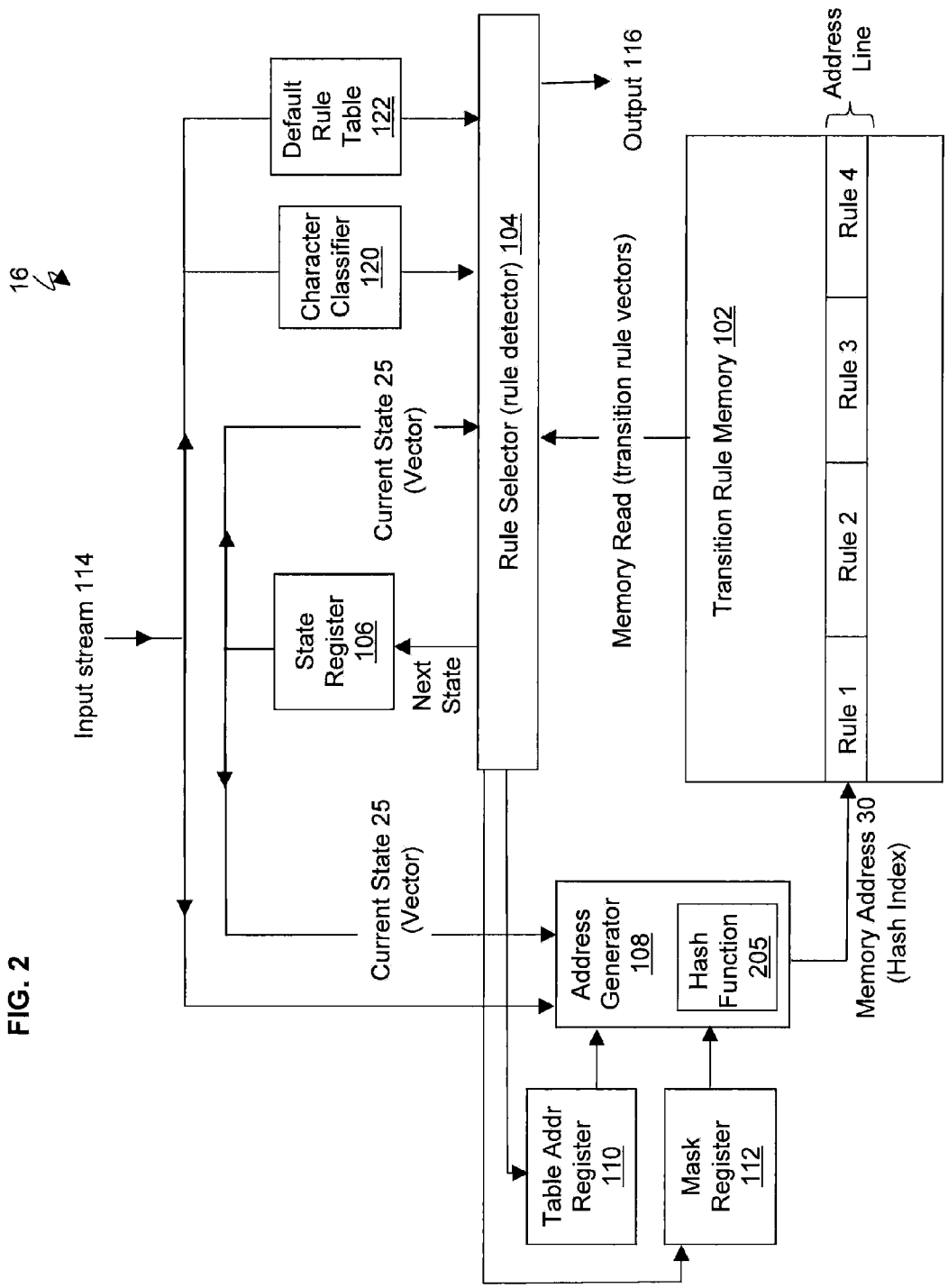
FIG. 2 depicts a block diagram of the subsystem 16 of the apparatus 10 according to exemplary embodiments.

FIG. 2 depicts a block diagram of the subsystem 16 of the apparatus 10 according to exemplary embodiments. The rule engine 16 may be referred to as the B-FSM engine 16, which is a fast programmable state machine originally designed for hardware implementation. A hash index (i.e., the BaRT hash index) is generated by an address generator 108 from the current input stream 114 value and a current state vector 25 in a state register 106 under control of a mask vector stored in a mask register 112. The hash index is calculated according to the following equation:

$$\text{index} = (\text{state' and not mask}) \text{ or } (\text{input' and mask}) \quad \text{Equation (1)}$$

where and, or and not are bit-wise operations, and state' and input' denote subsets of the state and input value having the same size as the mask vector (e.g., 8 bits). More details on this hash-function can be found in the above referenced paper: Jan Van Lunteren, entitled "High-Performance Pattern-Matching for Intrusion Detection", Proceedings of IEEE INFOCOM '06, Barcelona, Spain, April 2006.

This hash index is added to the start address of the current hash table which is stored in the table address register 110 to obtain a memory address 30 that will be used to access the transition rule memory 102. The memory address 30 is sometimes referred to as the hash index 30, since the memory address is based on the calculation of the hash index. Contents of the transition rule memory 102 are referred to collectively herein as a transition rule table. A total of "N" transition rules are retrieved from the accessed memory location in the transition rule memory 102, with N being an implementation parameter, typically in the range between one and eight (as an example, N has a value of four in FIG. 1). In this example, N can represent up to four different transition rules, such as rule 1 (R1), rule 2 (R2), rule 3 (R3), and rule 4 (R4). The transition rule memory 102 outputs a transition rule vector (shown in FIGS. 3 and 4) based on the hash index 30 (i.e., memory address) generated by the address generator 108. There is an individual transaction rule vector output for each rule 1, 2, 3, and 4 to be utilized for comparison by the rule selector 24. A character classifier 120 provides character class information for the input value, e.g., if it is a digit and/or alphanumeric character, to the rule selector 24.

By the rule selector 24, the test portions of the N transition rules (i.e., transition rule vectors) are each evaluated and tested in parallel against the current input stream 114 value, the class information from the character classifier 120, and the current state 25 from the state register 106. The highest priority transition rule that is found to be matching is then used to update the state register 106 with a new state value and to generate an output vector 116. If the rule selector 104 does not find a matching transition rule, a default rule is utilized from the default rule table 122.

Figure 3:
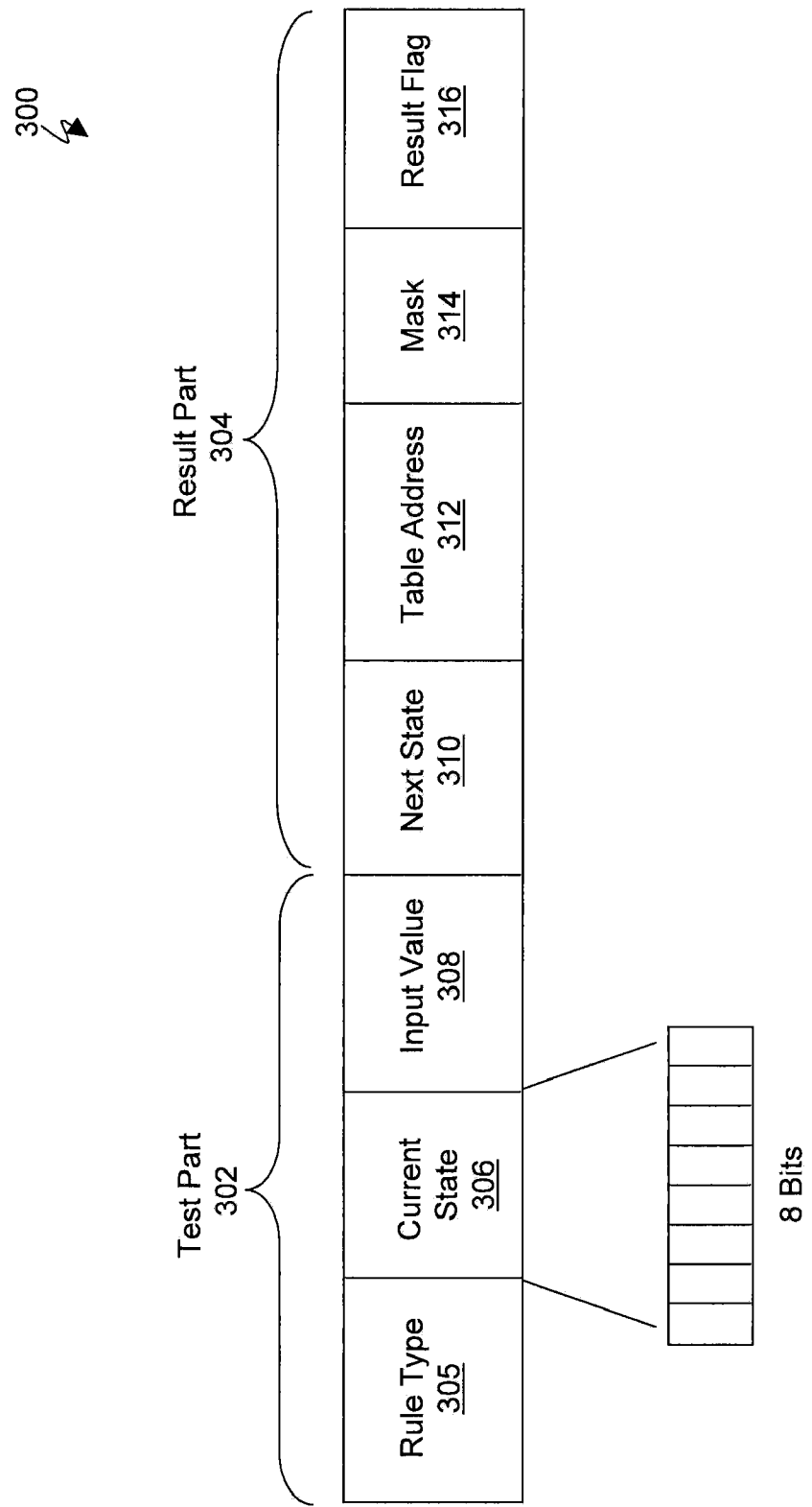
FIG. 3 illustrates a state of the art transition rule vector.

FIG. 3 illustrates an example of a state of the art transition rule vector 300, which could be any of the rules, such as rule 1, rule 2, rule 3, rule 4, etc., from the memory address 30 of the transition rule memory 102. As depicted in FIG. 3, the transition rule vector 300 shows a format having seven fields, which form a test part 302 and a result part 304. The result part 304 can be also referred to as a next state information part 304. The test part 302 includes exact match, case-insensitive, wildcard, and/or class conditions in rule type 305 for a test current state 306 of the rule and a test input value 308 of the rule. The result part 304 includes a next state 310, a table address 312, a mask 314, and a result flag 316. It might include additional fields, for example, to store instructions for the result processor 18. The test current state 306 and the test input value 308 are compared to the actual current state vector 25 of the state register 106 and the current input value 114 to determine if the test part 402 in the transition rule vector 300 is a match. This determines if the data in the next state information part 304 of the transition rule vector 300 should be utilized to determine the next state.

The table address 312 indicates the base address of the transition rule table to be utilized by the next state 310. The next state mask 314 provides the mask vector that is to be used by the address generator 108 to generate a memory address 30 for the next state 310. The setting of the result flag 316 indicates that the next state corresponds to the detection of a pattern in the input stream 114. The B-FSM concept described above can be optimized in various ways. Examples of such optimizations and additional general information are described in more detail in the above referenced paper: Jan Van Lunteren, entitled "High-Performance Pattern-Matching for Intrusion Detection", Proceedings of IEEE INFOCOM '06, Barcelona, Spain, April 2006.

Exemplary embodiments are configured to utilize a modified transition rule vector as shown in FIG. 4. The modified transition rule vector 400 is similar to the transition rule vector 300 and functions/operates as discussed above for transition rule vector 300. However, the transition rule vector 400 comprises a short state tag 406 (also referred to as state tag 406) in place of the current state 306.

In the original B-FSM scheme, each transition rule vector 300 contains a so called test current state field 306 that is used to find the correct rule that matches the current state vector 25 stored in the state register 106 in addition to a similar test on the test input value 308 and current input value 114. This was done by the comparison performed by the rule selector 104. The current state field 306 in the original scheme has a width that is equal to the width of the current state vector 25 stored in the state register 106, which typically is in the range of 8 to 10 bits. So, e.g., the 8 bit current state vector 25 had to match the 8 bit test current state field 306. However, exemplary embodiments now reduce the size of this field, e.g., to 2 or 3 bits, by replacing the current state field 306 with the so called current short state tag 406, and the rule selector 104 is now configured to test, e.g., the 2 bit (or 3 bit) state tag 406 against the same number of most significant (e.g., 2) bits of the current state vector 25 in the state register 106.

As compared to the transition vector 300 with the current state filed 306, utilizing the short state tag 406 in place of the current state 306 allows the entire transition rule vector 400 to be reduced in size by about 6 to 8 bits which corresponds to about 20% for typical B-FSM implementations. This typically does not affect or only marginally affects the total of number of rules in the data structure, and utilizing the state tag 406 results in a direct reduction in storage requirements of about 20% for the transition rule memory 102. In one implementation of exemplary embodiments, the removed bits in each rule vector 400 can also be used to store extra information (e.g., instructions) inside each rule vector 400, which enables the extension of the functionality of the rule engine 16.

For example purpose, assume that the current state 306 is 8 bits. However, in FIG. 4, the current state tag 406 is shown as 2 bits. Optionally, the current state tag 406 may be 3 bits, which is illustrated by the dashed lines. In FIG. 4, the rule selector 104 is configured to compare the 2 bits of the state tag 406 in the test part 402 against the first 2 bits (most significant bits) of the current state vector 25 (which still has 8 bits) received from state register 106, while comparing the current input value 114 to the input value 308 in the test part 402. The same comparison can be performed for 3 bits if the short state tag 406 is 3 bits.

To realize the replacement of the current state field 306 by the shorter current state tag 406 that is (only) tested against the most significant state bits of the current state vector 25 of the state register 106, without impacting the basic operation of the rule engine 16 (B-FSM), the pattern compiler 20 (also referred to as a B-FSM compiler 20) is modified to ensure that no errors can occur during the rule engine 16 (B-FSM) operation. Namely, the pattern compiler 20 is configured to check that for short state tags 406 that are being shared by multiple states (i.e., these states have been encoded using state vector having 2 or 3 identical most significant bits), no incorrect transition rule (such as rule 1, rule 2, rule 3, etc.) can be selected that corresponds to a different state for any given input value 114 and actual current state 25 combination.

According to exemplary embodiments, an example of code fragment 500 for performing this check of the pattern compiler 20 is illustrated in FIG. 5. This check is now implemented in the pattern compiler 20 by, e.g., the code fragment 500, which is performed each time the pattern compiler 20 tries to find a suitable vector to encode a given state after a hash function is selected that is defined by a mask vector when trying to map that given state on a given transition-rule table of the transition rule memory 102.

The check involves determining if a conflict could occur when the state would be encoded using a given state vector (the encoded-state-vector-under-test) with any state that was already mapped on the given transition-rule table, and for which an encoded state vector and mask were selected. If no conflict can occur with any of those states, then the encoded-state-vector-under-test can be used and will be assigned to the state. More specifically, the pattern compiler 20 will check that if the given state would be encoded using the encoded-state-vector-under-test, that for the selected mask and transition-rule table, the address generator can never generate a memory address (hash index) into the transition-rule table for any possible input value, containing at least one rule of a previously mapped/encoded state that was encoded using a state vector having the same short state tag as its most significant 2 or 3 bits. In this case, it is not possible that transition-rule table entries are accessed for any given input value, containing transition rules corresponding to different states encoded using state vectors involving the same short state tags as most significant bits, and consequently, no incorrect rule selection can occur due to the short state tags.

The conflict test with each already encoded/compiled state involves in a first step to check if the encoded state vectors share the same 2 or 3 most significant bits, i.e., to check if the corresponding (2 or 3-bit) current state tags 406 would be identical.

If that is the case, then the bit positions of common zero-bits in the masks for the current state and the already compiled state will be determined (commonNegatedMask in code fragment below). These correspond to the common hash-index bits that will be extracted from the respective encoded state vectors according to the above described Equation 1:

$$index = (state' \text{ and not } mask) \text{ or } (input' \text{ and } mask)$$

The other bits in the hash-indices will be extracted from the input value and, consequently, can have any value dependent of the input stream. If it appears that the encoded state vectors do not have any differences at the bit positions corresponding to the common zero-bits in their masks, then a conflict occurs, meaning that for given input values, the encoded state vectors and masks for both states can result in the same memory address (hash index) 30 being generated by the address generator 108. And, consequently, if the corresponding entry in the transition-rule table would contain a transition rule corresponding to one of the two states, then this transition rule can be selected incorrectly when the B-FSM is in the other state. In that case, the encoded-state-vector-under-test cannot be assigned and another encoded state vector has to be searched (and evaluated in the same way) until one is found without conflicts.

Further, exemplary embodiments are configured to utilize the state "don't care" condition in the short state tags 406. In one implementation of exemplary embodiments, an extension to the short (current) state tag 406 feature is to reserve one or a subset of state tag 406 values for specific purposes. For example, the rule engine 16 may be configured to use a state tag 406 starting with 11*b* (for a 3-bit state tag that corresponds to tag values 110*b* and 111*b*) to denote a state-don't-care condition; this will allow the rule selector 104 to match the state tag 406 value to which will match any value of the current state register 106 during the rule selection by the rule selector 104 as part of the rule engine 16 (B-FSM) operation. Additionally and/or alternatively, to show a state "don't care" for the state tag 406, all the bits could be set to 1, such as, e.g., 111 when 3 bits are utilized for the short tag 406. Accordingly, when the rule selector 104 looks to compare the state tag 406 to the first 3 bits of the current state 25, the rule selector 104 will recognize that no comparison is needed for the state because the state tag 406 is the state "don't care" indicated by the bit value 111. Accordingly, a match to the current state 25 is automatically determined by the rule selector 104 for the state "don't care".

Exemplary embodiments are configured to implement shared transition rules as discussed further herein.

It is determined that in many cases, deterministic finite automaton (DFA) descriptions can be generated for a given set of string and regular expression patterns of the input streams 114, in which multiple states share identical transition rules, i.e., these transition rules (e.g., such as rule 1, rule 2, etc.) involve the same input conditions (such as the input value 308) and the same next states (such as the next state 310). However, these transition rules have different current states 306 and/or different short state tags 406. Since these transition rules have different current states 306 and/or different short state tags 406, these transition rules are not identical. That is, each transition rule normally would have a different transition rule vector 300, 400. However, these transition rules may be referred to as shared transition rules because the shared transition rules involve the same input conditions (such as the input value 308) and the same next states (such as the next state 310) but a different current state tag 406 (and/or current state 306).

By the pattern compiler 20 exploiting these shared transition rules, exemplary embodiments can reduce the storage requirements of the transition rule memory 102 (in certain cases, well beyond a factor two or more). For example, the pattern compiler 20 optimizes the storage efficiency of the transition rule memory 102 by taking these shared rules among multiple states (such as S1, S2, S3, etc.) into account, by (a) using carefully selected hash functions 205 for two states, and/or (b) using the above concepts of short current state tags 406, such that each shared rule is only stored once (or as few times as possible) instead of being stored multiple times, once for each state as was the case with the original B-FSM scheme.

This will be explained below with reference to a deterministic finite automaton graph 600 (created by the pattern compiler 20), which involves the simultaneous detection of the multiple regular expression patterns using a single state machine, e.g., B-FSM engine 16 according to exemplary embodiments.

In this example, the multiple regular expression patterns are shown below:
pattern 0: abc.def
pattern 1: abc.klm
pattern 2: abc1pqr
pattern 3: abc[^1]xyz Note that in typical regular expression syntax, the '•' character is a metacharacter that matches any character (sometimes with the exception of the so called newline character). Furthermore, [^1] will match any character except for the character value '1'.

Figure 6A:
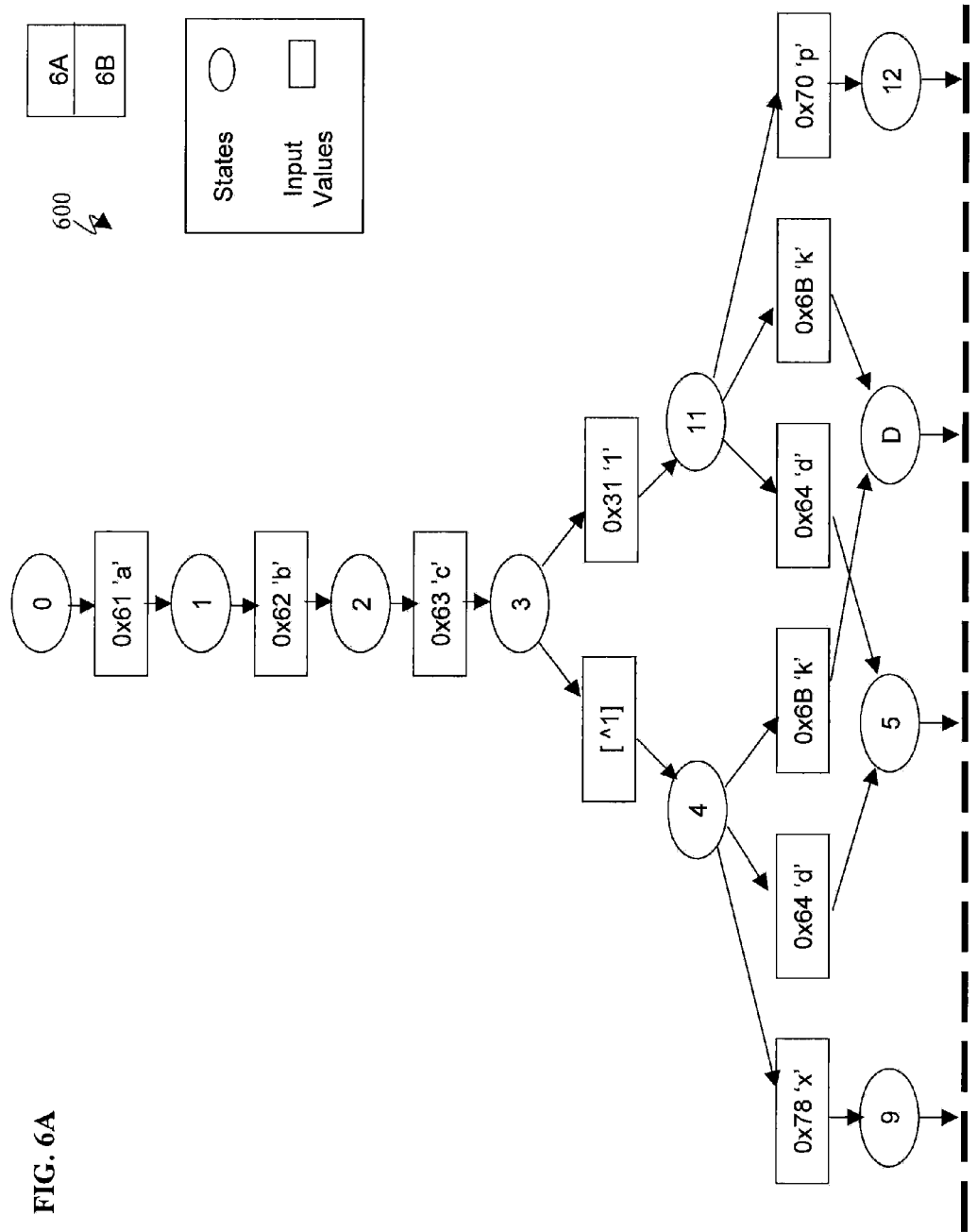
FIGS. 6A and 6B illustrate a graph according to exemplary embodiments.
Figure 6B:
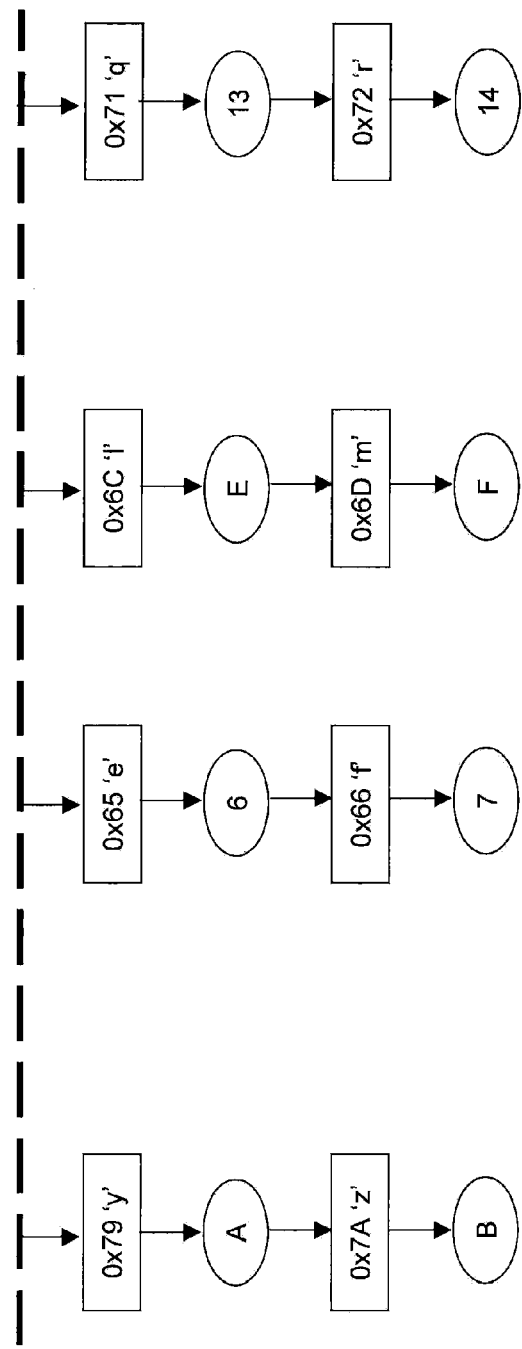

The above pattern matching function of the rule engine 16 is constructed in the deterministic finite automaton (DFA) 600 in FIG. 6. The state identifiers and input values (ASCII character codes) in DFA 600 are shown in hexadecimal notation. Each state (such as the current state 306 and/or the state tag 406) is designated by an oval, and each input value 308 is designated by a square box. Also, note that the current state 306 and/or the state tag 406 relate back to the current state vector 25, when there is a match.

In FIG. 6, two states which are state 4 and state 11 share two rules: 1) one rule corresponding to an input character 'd' to a next state 5; and 2) one rule corresponding to an input character 'k' to a next state D.

To pass data structures 22 to the rule engines 16 in FIG. 1, the pattern compiler 20 is configured to perform three functions: (1) it distributes the patterns over the rule engines 16, (2) converts the patterns allocated to each rule engine 16 into a DFA description, and (3) compiles these DFA descriptions into the hash-table-based data structure 22 that is directly executed by the rule engines 16. Also, in accordance with exemplary embodiments, the pattern compiler 20 is configured to execute a process as part of the third function mentioned above to assign encoded state vectors 25 and hash functions 205 (mask vectors) to the states (e.g., state 4 and sate 11) that share rules, and to assign short current state tags 406 including state "don't care" conditions to the shared rules and other rules, in such way that the shared rules are stored (only) once in the resulting data structure 22 (in the rule transition memory 102) and are correctly accessible from each of the states (state 4 and state 11) in combination with any possible input vector 114, whereas the remaining rules that are unique for the states are also correctly accessible from any state in combination with any possible input vector 114.

In the example case, the hash function 205 (of the address generator 108) is assumed according to the above described Equation 1:

index=(state' and not mask) or (input' and mask)

with the index and mask being 7-bit vectors, the input an 8-bit vector and the state a 9-bit vector. State' and input' denote the least significant 7 bits from the state vector 25 and input vectors 114. The short current state tag 406 in each rule (such as rule 1, 2, etc. where each rule is a transition vector rule 400) consists of 3 bits and is compared to the upper 3 bits of the 9-bit state vector 25. Based on this assumption, examples of encoded state vectors 25, hash functions 205, and short current state tags 406 for the above example may be assigned as shown in FIGS. 7, 8, and 9.

FIG. 7 illustrates the shared rules 700 which are determined by the pattern compiler 20 to be rules shared between state 4 and state 11 according to exemplary embodiments. For the shared rules 700, the pattern compiler 20 is configured to provide a data structure 22 for rule 1 (R1) and rule 2 (R2). For rule 1 (R1), the short state tag 406 has to match the most significant bits of the state (e.g., the current state vector 25) for state 4 and state 11. The input value 308 for this rule (which is to be matched against the input stream 114) is 'd', and the next state is state 5. Similarly, the pattern compiler 20 provides a data structure 22 for rule 2 (R2), such that the short state tag matches state 4 and state 11, the input value 308 is 'k', and the next state is state 5.

FIG. 8 illustrates the unique rules 800 of state 4 and state 11 determined by the pattern compiler according to exemplary embodiments. As seen in FIG. 8 from the state conditions, rule 3 (R3) is unique to state 4, and rule 4 (R4) is unique to state 11. These rules are not shared between states 4 and 11.

FIG. 9 illustrates the encoding of the current state vectors 25 by the pattern compiler 20 for state 4 and state 11 according to exemplary embodiments. For example, the pattern compiler 20 encodes state 4 with an encoded state vector 25 which is equal to 0 0000 0000b and with a mask vector equal to 000 0000b. Based on Equation 1, the address generator 108 will always generate for state 4 the memory address '0h' to access the transition rule memory 102, independent of the input stream 114 value. Also, the pattern compiler 20 encodes state 11 with its own encoded state vector 25 equal to 0 1000 0000b and with a mask vector equal to 001 0000b. For state 11, the address generator 108 will generate a memory address '0h' for all input stream 114 values containing a zero bit at the bit position corresponding to the single set bit in the mask (this is at bit position 4), which applies to input values 64h (01100100b) and 6Bh (01101011b) corresponding to the two shared rules R1 and R2. Furthermore, for state 11 the address generator 108 will generate a memory address '001 0000b' (10h) for all input stream 114 values, containing a set bit at the bit position corresponding to the single set bit in the mask (bit position 4), which applies to input value 70h (01110000b) corresponding to rule R4, being a unique rule for state 11.

Figure 10:
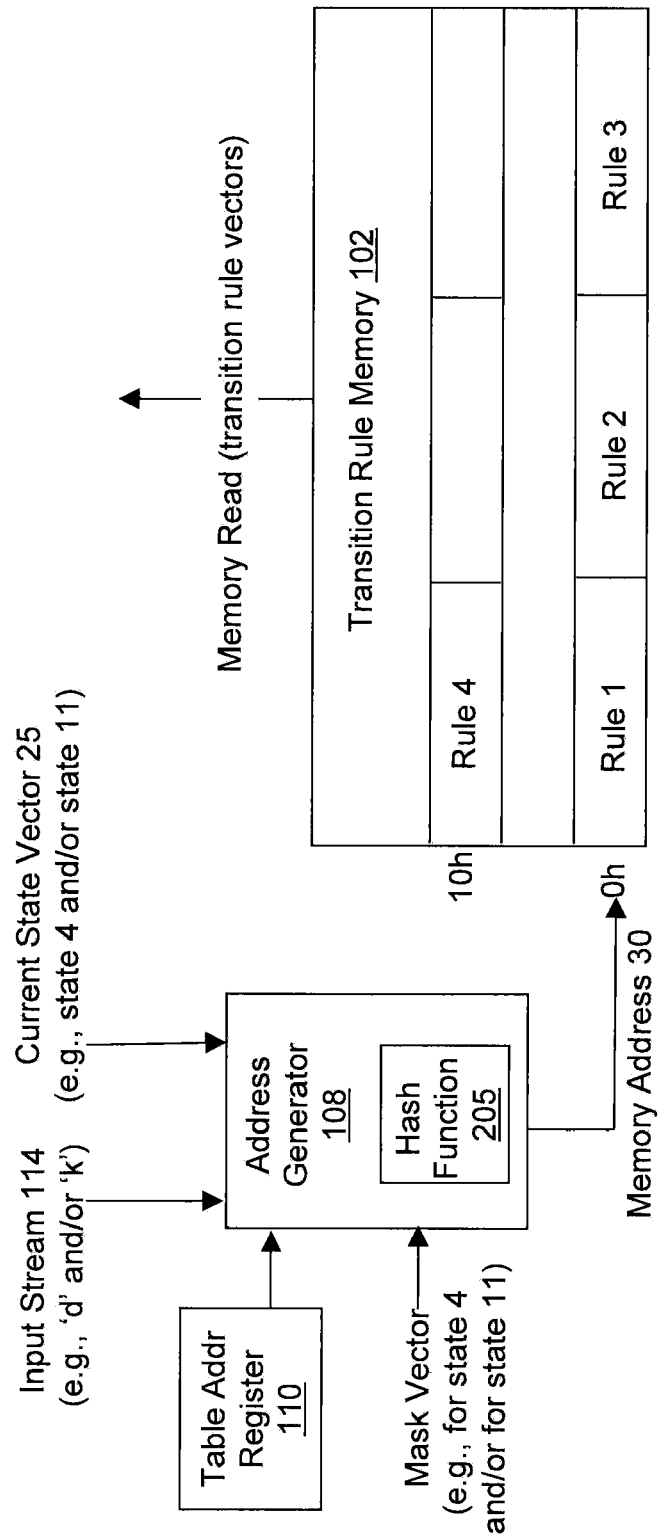
FIG. 10 illustrates a rule mapping example according to exemplary embodiments.

As seen in FIG. 10, the memory address '0h' points to an address line in the transition rule memory 102 which stores rule 1 (R2), rule 2 (R2), and rule 3 (R3), and the memory address '10h' points to an address line which stores rule 4 (R4). The shared rules R1 and R2 include a short state tag 406 defining a state "don't care" condition as described above (e.g., by assigning it a value 111b), which will consequently match the most significant bits of both the encoded state vectors of state 4 and state 11. Rule R3 which is unique to state 4, contains a short state tag comprising the 3 most significant bits of the encoded state vector of state 4, namely 000b, and will therefore only match the most significant bits of the encoded state vector of state 4 but not the most significant bits of the encoded state vector of state 11. Rule R4 which is unique to state 11, contains a short state tag comprising the 3 most significant bits of the encoded state vector of state 11, namely 010b, and will therefore only match the most significant bits of the encoded state vector of state 11 but not the most significant bits of the encoded state vector of state 4.

From the above description, it can be seen that if the B-FSM engine 16 is in state 4, then an input stream 114 value equal to 64h (character 'd'), 6Bh (character 'k') or 78h (character 'x'), will result in an address '0'h being generated by the address generator, followed by the retrieval of the corresponding memory line containing rule R1, rule R2 and rule R3 from the Transition Rule Memory 102. The short state tags 406 contained in rule R1, rule R2, and rule R3, as described above, will all match the most significant bits of the encoded state vector of state 4. Consequently, if the input equals 64h, 6Bh or 78h then respectively rule R1, rule R2 or rule R3 will be selected, which is conform the correct rule selection for the given set of transition rules of state 4 and corresponding input values. For other input stream (114) values no matching rule will be found.

From the above description, it can also be seen that if the rule (B-FSM) engine 16 is in state 11, that then an input stream 114 value equal to 64h (character 'd') or 6Bh (character 'k') will result in an address '0'h being generated by the address generator, followed by the retrieval of the corresponding memory line containing rule R1, rule R2 and rule R3 from the Transition Rule Memory 102. The short state tags contained in rule R1, rule R2, and rule R3, as described above, will ensure that only rule R1 and R2 will match the most significant bits of the encoded state vector of state 11, and that rule R3 will not match. Consequently, if the input equals 64h or 6Bh then respectively rule R1 or rule R2 will be selected. If the input stream 114 value, however, equals 70h (character 'p') then an memory address '10h' is generated by the address generator, followed by the retrieval of the corresponding memory line containing rule R4, which contains a short state tag 406 matching the most significant bits of the encoded state vector of state 11. Consequently, rule R4 will be selected in this case. The described operation of the rule engine 16 makes the correct rule selection for the given set of transition rules for state 11 and corresponding input values.

In state of the art systems, rule 1 would have to be stored twice (once for state 4 and once for state 11) as two distinct rules because the state tag 306 would be different for each state 4 and 11. Likewise, rule 2 would have to be stored twice (once for state 4 and once for state 11). However, exemplary embodiments are configured to utilize a mask vector for the current state vector 25 for state 4 and a mask vector for the current state vector 25 for state 11, so that the address generator 108 can generate (via the hash function 205) the same memory address '0h' pointing to a single address line in the transition rule memory 102 for the shared rules 1 and 2 without having to duplicate storage of shared rules 1 and 2 as explained above. For this example of states 4 and 11, the pattern compiler 20 can reduce the accumulated rule storage in the transition rule memory 102 from a total of 6 rules (3 separate rules for state 4 and 3 separate rules for state 11) down to 4 rules, as the example illustrated, corresponding to a reduction in storage requirements of 33%. Note that FIG. 10 shows only certain elements of the rule engines 16 for conciseness, but it is understood that the remaining elements may be included as shown in FIG. 2.

In order to have the pattern compiler 20 support shared rules as described above, the patent compiler 20 is configured to perform the following two steps. In a first step, one or multiple sets of states are determined in a given DFA (such as the DFA 600) which share one or multiple shared rules. This can be done by comparing for each possible pair (or group) of states in the DFA, the input values and next state combinations involved in the state transitions originating at those states. Next, an ordering is performed to create an ordered list with state pairs (or groups) such that pairs (or groups) of states involving the largest number of shared rules are located at the beginning of the list. Because the latter pairs (or groups) have the largest number of shared rules, mapping these shared rules only once can consequently result in the largest savings in storage requirements and is therefore given priority by placing those pairs (or groups) of states at the beginning of the list, which will be processed first in the second step.

In a second step, these pairs (or groups) of states are then compiled together to realize the mapping/encodings such as shown in the above example. In the most general case, all rules for the pair (or group) of states together, are mapped as if these were related to a single state, with the shared rules only handled once. Next, each state is assigned the same hash function (mask) coming from this step. Then each state is assigned a unique encoded state vector, which differs in its most three significant bits (to provide for unique short current state tags 406) and which can differ at any bit position corresponding to a set bit in the mask for that state. The shared rules are then assigned state 'don't care' conditions (short current state tag starting with 11b) and the remaining unique states are assigned short current state tags identical to the 3 most significant bits of the encoded state vector of their corresponding states. As the above example shows, in practice simpler assignments are possible which allow exemplary embodiments to exploit a larger number of shared rules for a given number of states.

Figure 11:
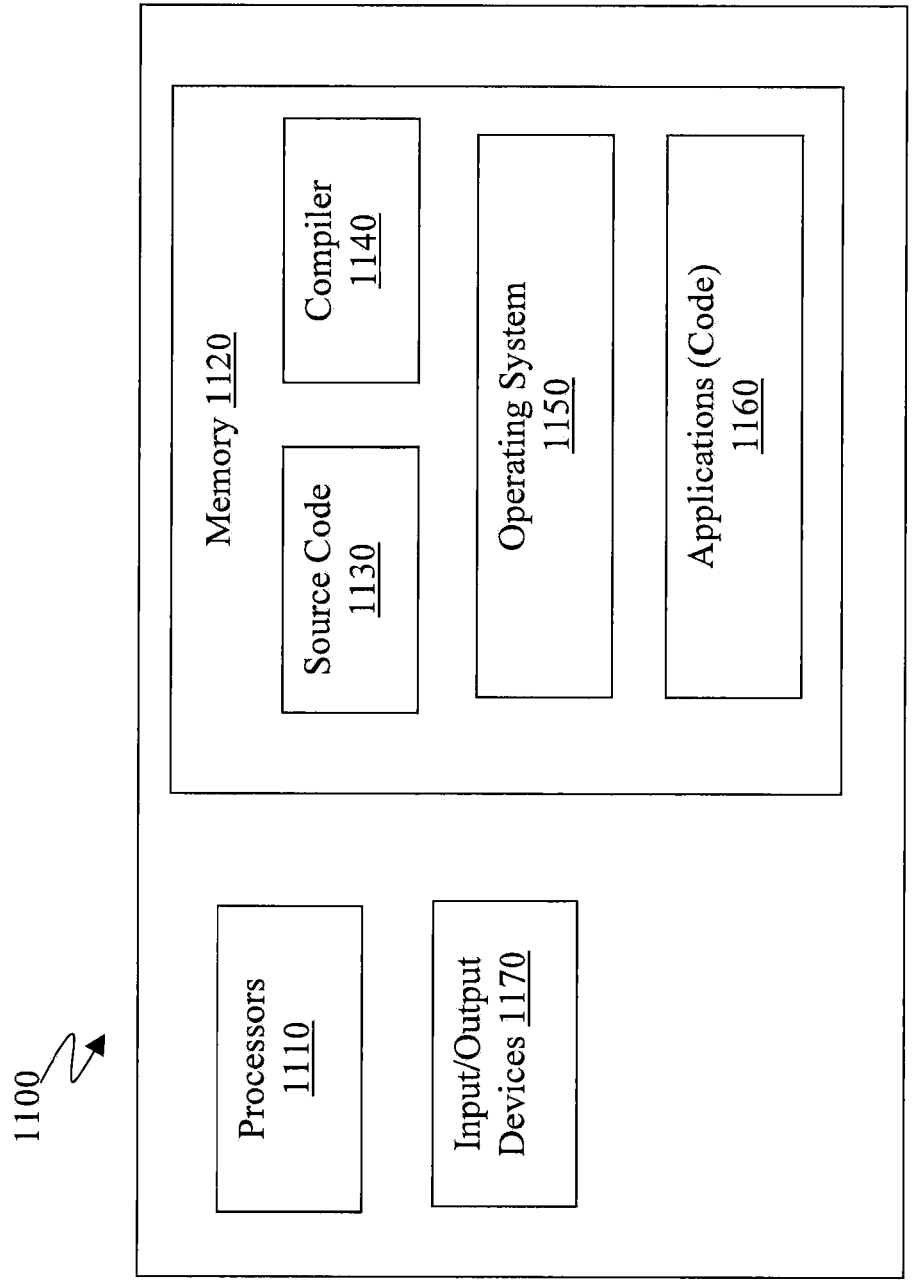
FIG. 11 illustrates an example of a computer having capabilities, which may be included in exemplary embodiments.

FIG. 11 illustrates an example of a computer 1100 having capabilities, which may be included in exemplary embodiments. Various methods, procedures, modules, flow diagrams, tools, application, and techniques discussed herein may also incorporate and/or utilize the capabilities of the computer 1100. Moreover, capabilities of the computer 1100 may be utilized to implement features of exemplary embodiments discussed herein in FIGS. 1-10.

Generally, in terms of hardware architecture, the computer 1100 may include one or more processors 1110, computer readable storage memory 1120, and one or more input and/or output (I/O) devices 1170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1110 is a hardware device for executing software that can be stored in the memory 1120. The processor 1110 can be virtually any custom made or commercially available processor, a central processing unit (CPU), a data signal processor (DSP), or an auxiliary processor among several processors associated with the computer 1100, and the processor 1110 may be a semiconductor based microprocessor (in the form of a microchip) or a macroprocessor.

The computer readable memory 1120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1120 may incorporate electronic, magnetic, optical, and/or other types of storage media. Note that the memory 1120 can have a distributed architecture, where various components are situated remote from one another, but can be accessed by the processor 1110.

The software in the computer readable memory 1120 may include one or more separate programs, each of which comprises an ordered listing of executable instructions for implementing logical functions. The software in the memory 1120 includes a suitable operating system (O/S) 1150, compiler 1140, source code 1130, and one or more applications 1160 of the exemplary embodiments. As illustrated, the application 1160 comprises numerous functional components for implementing the features, processes, methods, functions, and operations of the exemplary embodiments. The application 1160 of the computer 1100 may represent numerous applications, agents, software components, modules, interfaces, controllers, etc., as discussed herein but the application 1160 is not meant to be a limitation.

The operating system 1150 may control the execution of other computer programs, and provides scheduling, input-output control, file and data management, memory management, and communication control and related services.

The application(s) 1160 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 1160 may be a source program, executable program (object code), script, or any other entity comprising a set of instructions to be performed. When a source program, then the program is usually translated via a compiler (such as the compiler 1140), assembler, interpreter, or the like, which may or may not be included within the memory 1120, so as to operate properly in connection with the O/S 1150. Furthermore, the application 1160 can be written as (a) an object oriented programming language, which has classes of data and methods, or (b) a procedure programming language, which has routines, subroutines, and/or functions.

The I/O devices 1170 may include input devices (or peripherals) such as, for example but not limited to, a mouse, keyboard, scanner, microphone, camera, etc. Furthermore, the I/O devices 1170 may also include output devices (or peripherals), for example but not limited to, a printer, display, etc. Finally, the I/O devices 1170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1170 also include components for communicating over various networks, such as the Internet or an intranet. The I/O devices 1170 may be connected to and/or communicate with the processor 1110 utilizing Bluetooth connections and cables (via, e.g., Universal Serial Bus (USB) ports, serial ports, parallel ports, FireWire, HDMI (High-Definition Multimedia Interface), etc.).

When the computer 1100 is in operation, the processor 1110 is configured to execute software stored within the memory 1120, to communicate data to and from the memory 1120, and to generally control operations of the computer 1100 pursuant to the software. The application 1160 and the O/S 1150 are read, in whole or in part, by the processor 1110, perhaps buffered within the processor 1110, and then executed.

When the application 1160 is implemented in software it should be noted that the application 1160 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1160 can be embodied in any computer-readable medium 1120 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 1120 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1160 is implemented in hardware, the application 1160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1100 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. An apparatus, comprising:
   an address generator operative to receive a current state vector and a current input value, wherein the address generator is operative to generate a memory address corresponding to a transition rule in response to the current state vector and the current input value;
   a transition rule memory comprising a plurality of memory addresses, wherein the memory address is a location in the transition rule memory; and
   a rule selector;
   wherein the transition rule is a transition rule vector comprising a short state tag field;
   wherein the short state tag field comprises fewer bits than the current state vector;
   wherein the rule selector is operative to ensure that the short state tag field is not an error by correlating the memory address to the short state tag field since the memory address is derived from the current state vector; and
   wherein when the rule selector determines that there is no correlation between the memory address and the short state tag field, the rule selector is operative to recognize the error.

2. The apparatus of claim 1, wherein the short state tag field comprises two bits.

3. The apparatus of claim 1, wherein the short state tag field comprises three bits.

4. The apparatus of claim 1, wherein the short state tag field is configured to identify a current state of the transition vector.

5. The apparatus of claim 1, wherein the current state vector is configured to identify a current state of a state register.

6. The apparatus of claim 1,
   wherein the rule selector is operative to determine if a first current state of the current state vector matches a second current state of the short state tag field.

7. The apparatus of claim 6, wherein the rule selector is operative to determine if the current input value matches a test input value of the transition rule vector.

8. The apparatus of claim 7, wherein if the first current state of the current state vector matches the second current state of the short state tag field and if the current input value matches the test input value of the transition rule vector, the rule selector is operative to select the transition rule vector.

9. The apparatus of claim 6, wherein the rule selector is operative to determine if the first current state of the current state vector matches the second current state of the short state tag field by checking the upper bits of the current state vector against the bits of the short state tag field; and
   wherein when the upper bits match the bits of the short state tag field, the transition rule vector is selected.

10. The apparatus of claim 1, wherein the short state tags are configured to designate an "any state" condition based on a value of the bits.

11. An apparatus, comprising:
    a transition rule memory comprising a plurality of memory addresses which are locations in the transition rule memory;
    a pattern compiler operative to:
        determine input values for states;
        determine next states for the states;
        for the states that have matching input values and matching next states, determine that the states have a shared rule; and
        for the states that have the shared rule, store the share rule in the transition rule memory at a same memory address to be utilized by the states that have the shared rule;
    wherein for the states that have the shared rule, the pattern compiler is operative to assign unique current state vectors each differing in three significant bits; and
    wherein the pattern compiler is operative to assign mask vectors for the states that have the shared rule.

12. The apparatus of claim 11, further comprising an address generator;
    wherein the address generator is operative to generate the same memory address for the states that have the shared rule based on the mask vectors and the unique current state vectors.

13. The apparatus of claim 11, wherein the three significant bits that differ for the unique current state vectors are provided as short tags that correspond to the shared rule.

14. The apparatus of claim 11, wherein the states that have the shared rule comprise a first state and a second state;
    for the first state and second state, the pattern compiler is operative to:
    map the shared rule only once for the first and second states to reduce storage requirements in the transition rule memory;
    place the first and second states having the shared rule at a beginning of a list for processing all states.

15. The apparatus of claim 14, wherein the pattern compiler is operative to:
    compile the first and second states together such that the first and second states are mapped as being a single state, with the shared rule of the first and second states only handled once; and
    assign the first and second states the same hash function.

16. A method for transition rule sharing, comprising:
    receiving by an address generator a current state vector and a current input value,
    generating a memory address corresponding to a transition rule in response to the current state vector and the current input value;
    wherein the memory address is a location in the transition rule memory; and
    wherein the transition rule is a transition rule vector comprising a short state tag field;
    providing the short state tag field with fewer bits than the current state vector;
    wherein a rule selector is operative to ensure that the short state tag field is not an error by correlating the memory address to the short state tag field since the memory address is derived from the current state vector; and
    wherein when the rule selector determines that there is no correlation between the memory address and the short state tag field, the rule selector is operative to recognize the error.

17. A method for transition rule sharing, comprising:
  determining input values for states;
  determining next states for the states;
  for the states that have matching input values and matching next states, determining that the states have a shared rule;
  for the states that have the shared rule, storing the share rule in a transition rule memory at a same memory address to be utilized by the states that have the shared rule;
  wherein for the states that have the shared rule, the pattern compiler is operative to assign unique current state vectors each differing in three significant bits; and
  wherein the pattern compiler is operative to assign mask vectors for the states that have the shared rule.

* * * * *